(12) United States Patent
Huizar et al.

(10) Patent No.: US 12,510,758 B2
(45) Date of Patent: Dec. 30, 2025

(54) EYE REFLECTIONS USING IR LIGHT SOURCES ON A TRANSPARENT SUBSTRATE

(71) Applicant: APPLE INC., Cupertino, CA (US)

(72) Inventors: Richard G. Huizar, San Diego, CA (US); Branko Petljanski, Bavaria-Bayern (DE); Qiong Huang, San Mateo, CA (US); Scott P. Foster, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/692,966

(22) PCT Filed: Sep. 19, 2022

(86) PCT No.: PCT/US2022/043956
§ 371 (c)(1),
(2) Date: Mar. 18, 2024

(87) PCT Pub. No.: WO2023/049065
PCT Pub. Date: Mar. 30, 2023

(65) Prior Publication Data
US 2025/0004283 A1  Jan. 2, 2025

Related U.S. Application Data

(60) Provisional application No. 63/248,198, filed on Sep. 24, 2021, provisional application No. 63/248,201, filed on Sep. 24, 2021.

(51) Int. Cl.
*G02B 27/01* (2006.01)
*H04N 23/20* (2023.01)

(52) U.S. Cl.
CPC ..... *G02B 27/0179* (2013.01); *G02B 27/0172* (2013.01); *H04N 23/20* (2023.01);
(Continued)

(58) Field of Classification Search
CPC ........ G02B 2027/0178; G02B 27/0172; G02B 27/017
See application file for complete search history.

(56) References Cited

U.S. PATENT DOCUMENTS 4,467,193 A * 8/1984 Carroll ..................... G01V 8/20
313/500
6,315,412 B1 * 11/2001 Snodderly .............. A61B 3/063
351/200
(Continued)

FOREIGN PATENT DOCUMENTS

WO     2024063978 A1     3/2024

OTHER PUBLICATIONS

Bezshlyakh DD, Spende H, Weimann T, Hinze P, Bornemann S, Gülink J, Canals J, Prades JD, Dieguez A, Waag A. Directly addressable GaN-based nano-LED arrays: fabrication and electro-optical characterization. Microsystems & Nanoengineering. Oct. 19, 2020;6(1):88. (Year: 2020).*

(Continued)

*Primary Examiner* — Clifford Hilaire
(74) *Attorney, Agent, or Firm* — Thompson Hine LLP

(57) ABSTRACT

Various implementations disclosed herein include electronic devices, systems, and methods that detect reflections of light produced by a plurality of light sources reflected from an eye. An example electronic device may include a frame, an image sensor, a transparent substrate coupled to the frame, a waveguide coupled to the transparent substrate, and a processor coupled to the plurality of IR light sources. The transparent substrate may include a plurality of infrared (IR) light sources that may be configured in a spatial arrangement within the transparent substrate or on a surface of the transparent substrate. The waveguide may be configured to display a projected image. The processor may be configured to receive sensor data from the image sensor. The sensor data
(Continued)

may correspond to a plurality of reflections of light produced by the plurality of IR light sources and reflected from an eye.

26 Claims, 8 Drawing Sheets

(52) U.S. Cl.
CPC .............. *G02B 2027/0138* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 9,619,943 B2 | 4/2017 | Perez | |
| 10,718,886 B1 | 7/2020 | Sharma | |
| 10,838,132 B1 | 11/2020 | Calafiore | |
| 10,977,815 B1 * | 4/2021 | Chao | G06T 7/521 |
| 11,397,465 B1 | 7/2022 | Mattila | |
| 2014/0151334 A1 * | 6/2014 | Matsumoto | C01B 32/16 |
| | | | 216/69 |
| 2017/0277259 A1 | 9/2017 | Mullins | |
| 2018/0116023 A1 * | 4/2018 | Schmidt | H05B 45/10 |
| 2020/0355929 A1 | 11/2020 | Zhang | |
| 2020/0386989 A1 | 12/2020 | Hatzilias | |
| 2021/0266474 A1 | 8/2021 | Sharma | |
| 2022/0026719 A1 | 1/2022 | Manly | |

OTHER PUBLICATIONS

European Patent Office (ISA/EP), Invitation to Pay Additional Fees and Partial International Search, International Application No. PCT/US2022/043956, 12 pages, Dec. 16, 2022.

European Patent Office (ISA/EP), International Search Report and Written Opinion of the International Searching Authority, International Application No. PCT/US2022/043956, 18 pages, Feb. 6, 2023.

* cited by examiner

EYE REFLECTIONS USING IR LIGHT SOURCES ON A TRANSPARENT SUBSTRATE

CROSS-REFERENCE TO RELATED APPLICATIONS

This patent application is the national stage of International Application No. PCT/US2022/043956 (International Publication No. WO 2023/049065) filed on Sep. 19, 2022, which claims the benefit of U.S. Provisional Application No. 63/248,198 filed on Sep. 24, 2021, entitled "EYE REFLECTIONS USING IR LIGHT SOURCES ON A TRANSPARENT SUBSTRATE," and U.S. Provisional Application No. 63/248,201 filed on Sep. 24, 2021, entitled "TRANSPARENT IR LIGHT SOURCES FOR EYE CHARACTERISTIC ANALYSIS," each of which is incorporated herein by this reference in its entirety.

TECHNICAL FIELD

The present disclosure generally relates to electronic devices, and in particular, to systems, methods, and devices for determining eye characteristics of users of electronic devices.

BACKGROUND

Existing eye-tracking techniques analyze glints that are reflected off of a user's eye and captured via an image sensor. Some head mounted systems may include eye-tracking techniques to analyze glint's using light projected from light sources located at an edge of a device (e.g., the frame of a pair of glasses). The eye-tracking system may lack accuracy, require more than one camera to capture a sufficient number of glints, and require eye camera placement that is suboptimal for capturing a sufficient number of glints. Thus, it may be desirable to provide a means of efficiently positioning of light sources to produce glints for assessing an eye characteristic (e.g., gaze direction, eye orientation, identifying an iris of the eye, etc.) for head mountable systems.

SUMMARY

Various implementations disclosed herein include devices, systems, and methods that assess an eye characteristic (e.g., gaze direction, eye orientation, identifying an iris of the eye, etc.) of a user wearing a head mounted device (HMD). The eye characteristic assessment is based on a determination of a location of a glint produced using a light source, such as an infrared (IR) light emitting diode (LED), a micro-IR LED, a mini-IR LED, or the like. Light sources are placed on a transparent substrate (e.g., a lens), which can be placed between a display (or view of a physical environment) and a human eye, to illuminate the eye to produce glints (e.g., a reflection of an IR LED on the eye). The light sources (e.g., IR LEDs) are positioned on or within the transparent substrate rather than (or in addition to) on a surrounding rim of the HMD.

In some implementations, the light sources may be connected to a power source with a transparent conductive material and may be driven individually. The light sources, such as IR LEDs, may be sufficiently small (e.g., less than 100 μm) such that a user in unlikely to notice them given their size and close proximity to the eye during use of the HMD (e.g., micro-IR LEDs, mini-IR LEDs, and the like). In some implementations, different wavelengths produced by the IR LEDs may be used for different applications.

The advantages of including the light sources in the lens/transparent substrate as opposed to on an edge of a frame of the eye piece/lens would allow a wider selection of areas to place the light sources, and potentially decrease the thickness of the frame around the lens. Additionally, because of a multi-stack architecture (e.g., a lens that includes a bias (−), air gaps, a waveguide, and a bias (+) layer), the light sources (e.g., IR LEDs) could be imbedded in the middle of the stack. This multi-stack architecture would not be perceptible to the user when in use and would have a better accuracy then on a surrounding rim of an HMD because the light sources are closer to an optical axis of an eye of the user. The positioning of each light source with respect to an adjacent light source also becomes important. For example, the light sources should not be too close to each other since then reflected light (e.g., a glint) can be too close and decrease the accuracy of the gaze estimate or assessing other eye characteristics. Additionally, the light sources should not be too far from an optical axis (e.g., around a rim of the frame) since the light sources will not reflect for some eye characteristics properly (e.g., the reflections may end up on the sclera and not the pupil).

In general, one innovative aspect of the subject matter described in this specification can be embodied in an electronic device including a frame, an image sensor, a transparent substrate coupled to the frame, the transparent substrate including a plurality of infrared (IR) light sources, where the plurality of IR light sources are configured in a spatial arrangement within the transparent substrate or on a surface of the transparent substrate, a waveguide coupled to the transparent substrate, wherein the waveguide is configured to display a projected image, and a processor coupled to the plurality of IR light sources. The processor is configured to receive sensor data from the image sensor, the sensor data corresponding to a plurality of reflections of light produced by the plurality of IR light sources and reflected from an eye.

These and other embodiments can each optionally include one or more of the following features.

In some aspects, the processor is coupled to the plurality of IR light sources via transparent conductors.

In some aspects, the transparent substrate is configured to display content. In some aspects, the transparent substrate includes a bias layer, and the plurality of IR light sources are configured in a spatial arrangement on a surface of the bias layer. In some aspects, the transparent substrate includes a waveguide.

In some aspects, each light source is equidistant from an adjacent light source. In some aspects, each light source is spaced from each adjacent light source based on a minimum distant constraint. In some aspects, the plurality of light sources are embedded within the transparent substrate. In some aspects, the plurality of light sources are connected to a power source via transparent conductors.

In some aspects, the plurality of light sources are less than 200 micrometers in diameter. In some aspects, the plurality of light sources are less than 100 micrometers in diameter. In some aspects, the plurality of light sources are individually addressable. In some aspects, the plurality of light sources are micro light emitting diodes (LEDs) (e.g., also referred to herein as "micro-LEDs"). In some aspects, the plurality of light sources are micro-infrared (IR) LEDs. In some aspects, the plurality of light sources are miniature light emitting diodes ("mini-LEDs").

In some aspects, the plurality of light sources are divided into subgroups, each subgroup including two or more light sources of the plurality of light sources. In some aspects, the subgroups of the plurality of light sources are dispersed throughout the transparent substrate.

In some aspects, the spatial arrangement includes a geometric shape. In some aspects, the geometric shape includes a parabola, an ellipse, a hyperbola, or a cycloid. In some aspects, the geometric shape is based on a transcendental curve or an algebraic curve.

In some aspects, the plurality of IR light sources are not perceptible to a human eye having average visual acuity when viewed from a distance of 1-5 cm. In some aspects, the electronic device is a head-mounted device (HMD).

In general, one innovative aspect of the subject matter described in this specification can be embodied in methods, at an electronic device having a processor, that include the actions of producing light from a plurality of light sources that are configured in a spatial arrangement within a transparent substrate or on a surface of the transparent substrate, where the plurality of light sources are configured to direct light toward an eye, and wherein a waveguide is coupled to the transparent substrate and is configured to display a projected image. The method further includes the actions of receiving sensor data from an image sensor, the sensor data corresponding to a plurality of reflections of the light reflected from the eye, and assessing a characteristic of the eye based on the sensor data.

These and other embodiments can each optionally include one or more of the following features.

In some aspects, assessing the characteristic from the eye includes determining an orientation of the eye based on identifying a pattern of the plurality of reflections of the light reflected from the eye.

In some aspects, assessing the characteristic from the eye includes determining a gaze direction of the eye based on the plurality of reflections of the light reflected from the eye. In some aspects, assessing the characteristic from the eye includes performing an authentication. In some aspects, assessing the characteristic from the eye is based on sensor data from a single sensor. In some aspects, performing the authentication includes identifying an iris of the eye.

In some aspects, the transparent substrate is configured to display content. In some aspects, the transparent substrate includes a waveguide. In some aspects, the plurality of light sources are embedded within the transparent substrate. In some aspects, the plurality of light sources are on a surface of the transparent substrate. In some aspects, the transparent substrate includes a bias layer, and the plurality of IR light sources are configured in a spatial arrangement on a surface of the bias layer.

In some aspects, the plurality of light sources are connected to a power source via transparent conductive material. In some aspects, the plurality of light sources are less than 200 micrometers in diameter. In some aspects, the plurality of light sources are less than 100 micrometers in diameter. In some aspects, the plurality of light sources are individually addressable.

In some aspects, the plurality of light sources are divided into subgroups, each subgroup including two or more light sources of the plurality of light sources. In some aspects, the subgroups of the plurality of light sources are dispersed throughout the transparent substrate.

In some aspects, determining the eye characteristic includes determining locations of multiple portions of the eye based on determining locations of multiple glints. In some aspects, the light is infrared (IR) light. In some aspects, the sensor includes an image sensor and receiving the reflected light includes receiving the reflected light from image data from the sensor. In some aspects, the plurality of IR light sources are not perceptible to a human eye having average visual acuity when viewed from a distance of 1-5 cm. In some aspects, the electronic device is a head-mounted device (HMD).

In general, one innovative aspect of the subject matter described in this specification can be embodied in an electronic device including a transparent substrate, a plurality of light sources on the transparent substrate, a sensor, a non-transitory computer-readable storage medium, and one or more processors coupled to the non-transitory computer-readable storage medium. The non-transitory computer-readable storage medium includes program instructions that, when executed on the one or more processors, cause the device to perform operations. The operations include producing light from a plurality of light sources on a transparent substrate, wherein the light from the plurality of light sources is configured to direct light toward an eye, receiving sensor data from an image sensor, the sensor data corresponding to a plurality of reflections of the light reflected from the eye of the user, and assessing an eye characteristic based on the sensor data.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs, the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
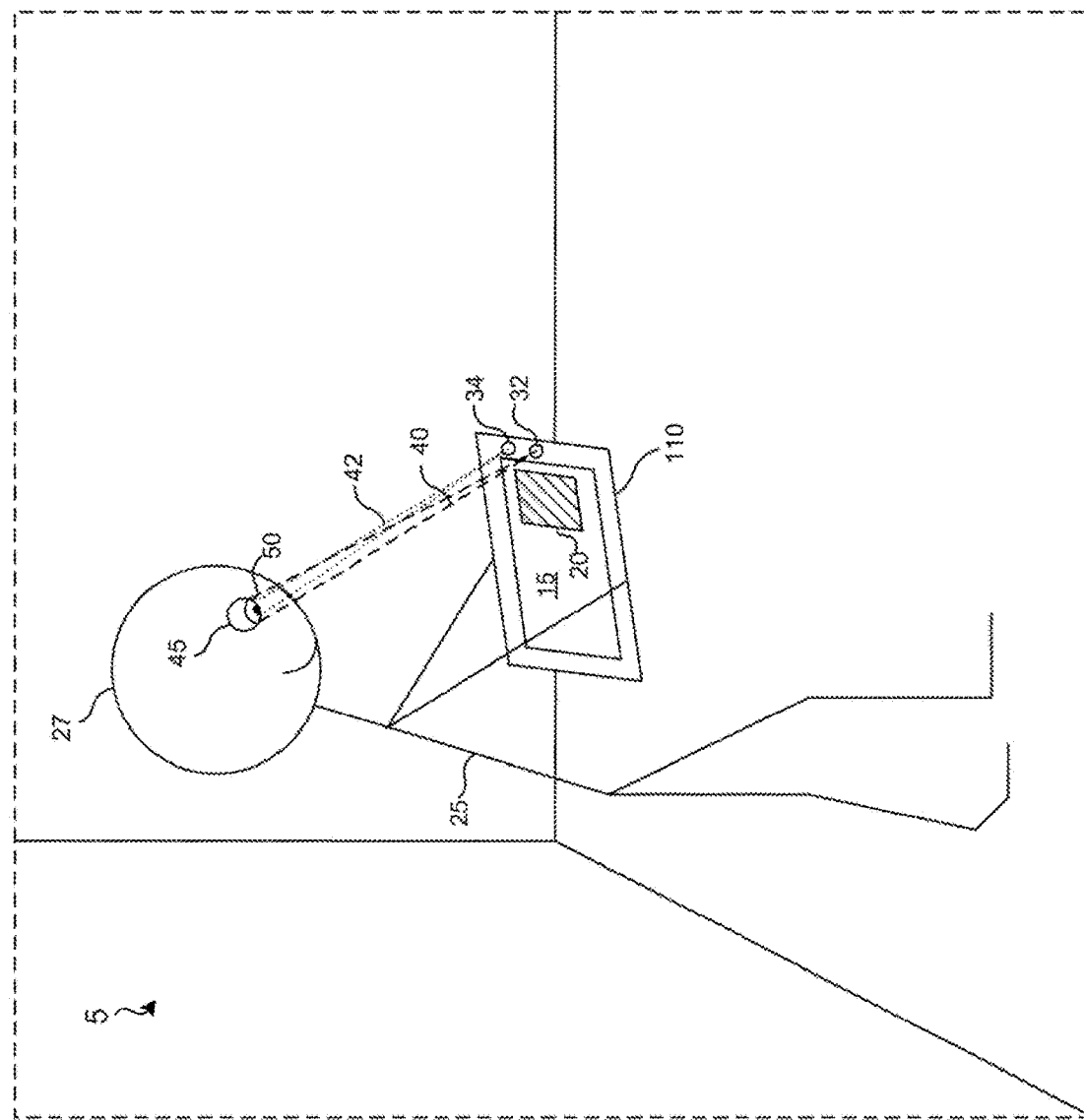
FIG. 1 illustrates a device displaying content and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an environment 5 (e.g., a room) including a device 110 with a display 15. In some implementations, the device 110 displays content 20 to a user 25. For example, content 20 may be a button, a user interface icon, a text box, a graphic, an avatar of the user or another user, etc. In some implementations, the content 20 can occupy the entire display area of display 15.

The device 110 obtains image data, motion data, and/or physiological data (e.g., pupillary data, facial feature data, etc.) from the user 25 via one or more sensors (e.g., sensor 32). The device 110 may obtain eye gaze characteristic data 40 via sensor 32. Additionally, the device 110 includes a light source 34 (e.g., a light-emitting diode (LED) that may be used to illuminate specular and diffusive parts of the eye 45 of the user 25.

While this example and other examples discussed herein illustrate a single device 110 in a real-world environment 5, the techniques disclosed herein are applicable to multiple devices as well as to other real-world environments. For example, the functions of device 110 may be performed by multiple devices, with the sensor 32 and light source 34 on each respective device, or divided among them in any combination.

In some implementations, as illustrated in FIG. 1, the device 110 is a handheld electronic device (e.g., a smartphone or a tablet). In some implementations the device 110 is a laptop computer or a desktop computer. In some implementations, the device 110 has a touchpad and, in some implementations, the device 110 has a touch-sensitive display (also known as a "touch screen" or "touch screen display"). In some implementations, the device 110 is a wearable device such as a head-mounted device (HMD).

In some implementations, the device 110 includes an eye-tracking system for detecting eye position and eye movements via eye gaze characteristic data 40. For example, an eye-tracking system may include one or more infrared (IR) LEDs (e.g., light source 34), a camera sensitive to the wavelengths emitted by the LEDs (e.g., near-IR (NIR) camera), and an illumination source (e.g., an NIR light source) that emits light (e.g., NIR light) towards the eyes of the user 25. The LEDs or IR LEDs may include different ranges of sizes. In some implementations, "mini-LEDs" may be utilized, which may range approximately 100 µm×100 µm±20 µm. Additionally, or alternatively, in some implementations, "micro-LEDs" may be utilized, which may range approximately 10 µm×10 µm±2 µm. Moreover, the illumination source of the device 110 may emit NIR light to illuminate the eyes of the user 25 and the NIR camera may capture images of the eyes of the user 25. In some implementations, images captured by the eye-tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 110.

In some implementations, the device 110 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, one or both eyes 45 of the user 25, including one or both pupils 50 of the user 25 use physiological data in the form of a pupillary response (e.g., eye gaze characteristic data 40) detected from a glint analysis. The pupillary response of the user 25 may result in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 110 may detect patterns of physiological data representing a time-varying pupil diameter.

The user data (e.g., eye gaze characteristic data 40) may vary in time and the device 110 may use the user data to generate and/or provide a representation of the user.

According to some implementations, the electronic devices described herein (e.g., device 110) may generate and present an extended reality (XR) environment to a user. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2B:
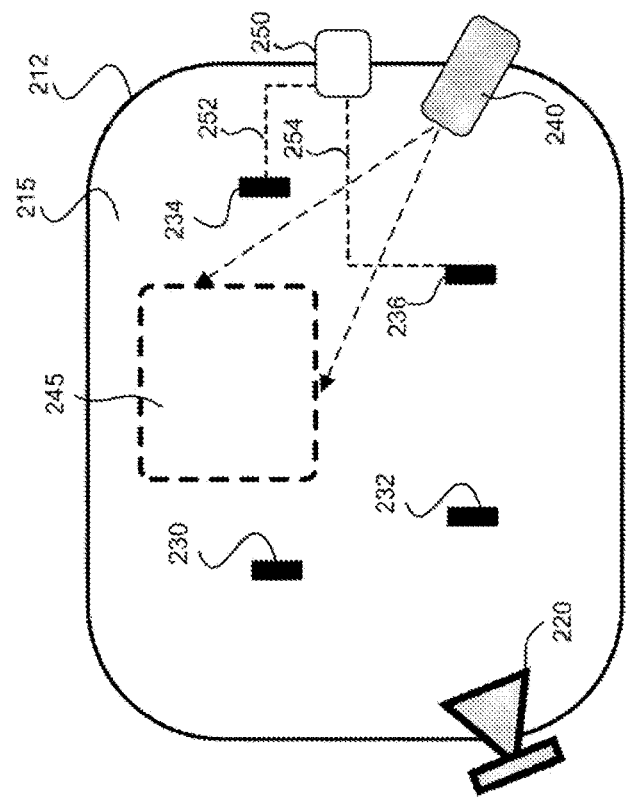
FIG. 2B illustrates an example view of a transparent substrate (lens) of the HMD of FIG. 2A.
Figure 2A:
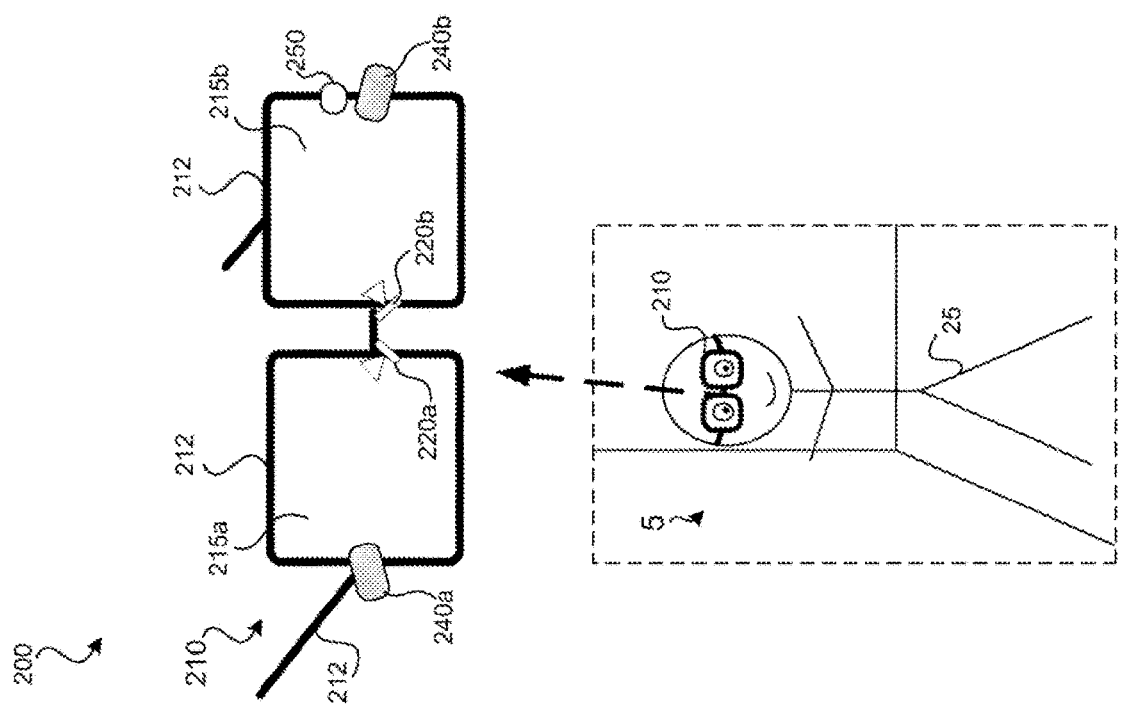
FIG. 2A illustrates an example of a user wearing an head mounted display (HMD) in accordance with some implementations.

FIG. 2A illustrates an example operating environment 200 of the real-world environment 5 (e.g., a room) including a user wearing device 210, an HMD. In this example, the device 210 is an HMD that includes a transparent or a translucent display that includes a medium through which light representative of images is directed to the eyes of user 25. In particular, device 210 is an HMD that may also be referred to herein as "AR glasses" or "XR glasses." Such XR glasses may include a transparent display to view the physical environment and be provided a display to view other content via retinal projection technology that projects graphical images within a view of a person's retina or onto a person's retina.

As illustrated, device 210 includes a frame 212 that can be worn on the user's head and may include additional extensions (e.g., arms) that are placed over ears of the user 25 to hold the frame in place on the user's head. The device 210 includes two displays for a left eye and a right eye of the user 25. The frame 212 supports a first lens 215*a*, and a second lens 215*b*. Each lens 215 includes a transparent substrate. Each lens 215 may be configured as a stack that includes a bias (+/−) for prescription lenses, a waveguide for housing or embedding a plurality of IR light sources and transparent conductors, and the like.

The device 210 further includes detector 220*a*, 220*b*, for each lens 215*a*, 215*b*, respectively. A detector 220 may be an image sensor, such as an IR camera, that detects reflected light rays from an eye of the user, such as a glint.

In some implementations, the device 210 further includes projector 240*a*, 240*b*, for each lens 215*a*, 215*b*, respectively. A projector 240 may be used to display XR content to the user (e.g., virtual content that appears to the user at some focal point distance away from the device 210 based on the configuration of the lens). A waveguide stacked within the lens 215 may be configured to bend and/or combine light that is directed toward the eye of the user 25 to provide the appearance of virtual content within the real physical environment 5, as further illustrated herein with reference to FIG. 4. In some implementations, the device 210 may only include one projector 240. For example, a pair of XR glasses for a user that only displays XR content on one side of the device 210 so the user 25 is less distracted and can have a greater view of the physical environment 5.

In some implementations, the device 210 further includes a controller 250. For example, the controller 250 may include a processor and a power source that controls the light being emitted from light sources. In some implementations, the controller 250 is a microcontroller that can control the processes described herein for assessing characteristics of the eye (e.g., gaze direction, eye orientation, identifying an iris of the eye) based on the sensor data obtained from the detector 220. Alternatively, the controller 250 may be communicatively coupled (e.g., wireless communication) with another device, such as a mobile phone, tablet, and the like, and the controller 250 may send data collected from the detector 220 to be analyzed by the other device. In the exemplary implementation, the device 210 (with the controller 250) is a stand-alone unit that can project the virtual content via projector 240 and assess characteristics of the eye via light sources for eye tracking purposes without communicating with another device. In some implementations, the plurality of light sources are individually addressable. For example, a processor within the controller 250 can control each light source 230, 232, 234, 236, etc. individually. A pattern of IR flashes can be created based on the spatial arrangement of the light sources, and the controller can control each light source to provide the intended pattern.

FIG. 2B illustrates an example view of a transparent substrate (e.g., lens 215). In particular, FIG. 2B illustrates a transparent substrate with components (some transparent/translucent) for an eye tracking system and XR display for the device 210. In this example, the lens 215 includes a plurality of light sources (e.g., mini-LEDs, micro-IR LEDs, and the like) 230, 232, 234, 236, a detector 220, a controller 250. The controller 250 may control and provide power to the light sources 230, 232, 234, 236 via transparent conductors. For example, as illustrated, light source 234 is powered and controlled by the controller 250 via transparent conductor 252, light source 236 is powered and controlled by the controller 250 via transparent conductor 254. The transparent conductors 252, 254, are configured to have a size that is small enough and/or are made of one or more transparent materials (e.g., transparent conducting films (TCFs)) so as to not be detectable by a human eye, and thus would be considered transparent and/or translucent when viewing content through the lens 215. The transparent conductors 252, 254, include an optically transparent and electrically conductive material including, but not limited to, indium tin oxide (ITO), wider-spectrum transparent conductive oxides (TCOs), conductive polymers, metal grids and random metallic networks, carbon nanotubes (CNT), graphen, nanowire meshes, and/or ultra thin films. In some implementations, the transparent conductors 252, 254 may include semi-transparent conductor materials such as silver nano traces or the like. For example, semi-transparent material may refer to a material that is not necessarily transparent but thin enough that the material is not perceptible to a human eye.

In some implementations, the plurality of light sources 230, 232, 234, 236 are IR sources, such as IR LEDs. In some implementations, the plurality of light sources 230, 232, 234, 236 are micro-IR LEDs. In some implementations, the plurality of light sources 230, 232, 234, 236 are mini-LEDs, also referred to herein as mini-IR LEDs. For example, the micro-IR LEDs or mini-IR LEDs may be a size that is small enough that is not detectable by a human eye, thus would be considered transparent and/or translucent when viewing content through the lens 215, such as pass through content of the physical environment 5, or XR content via display 245. For example, the mini-IR LEDs may be 200 µm, 100 µm, 75 µm, and 50 µm, and the micro-LEDs may be 25 µm, 10 µm, 5 µm, 1 µm, or another size that is not detectable by a human eye in ordinary use conditions.

The XR display system of the device 210 through lens 215 includes a projector 240 and a display 245 that may appear to the user as illustrated at the location of display 245. However, the light projected from the projector 240, as powered and controlled by the controller 250, is not directly projected as illustrated. Instead, the light from projector 240 is actually bent, via a waveguide, such that the XR content being displayed at display 245 appears to the user 25 at some focal point distance away from the device 210 based on the configuration of the waveguide.

In some implementations, the device 210 may only have one of the lens' 215 display XR content (e.g., the left eye lens 215b would be a normal lens without a detector 220b, without a projector 240, and thus without a display 245). For example, a left eye view would only present pass through content of the physical environment 5 (e.g., such as a normal pair of glasses), and the right eye view would have both pass through content of the physical environment 5, and have the capability to present XR content to the right lens 215a only. For example, only the right lens 215a would include light sources (e.g., micro-IR LEDs, mini-IR LEDs, and the like) 230, 232, 234, 236, a projector 240, and a display 245 to present XR content.

Figure 3:
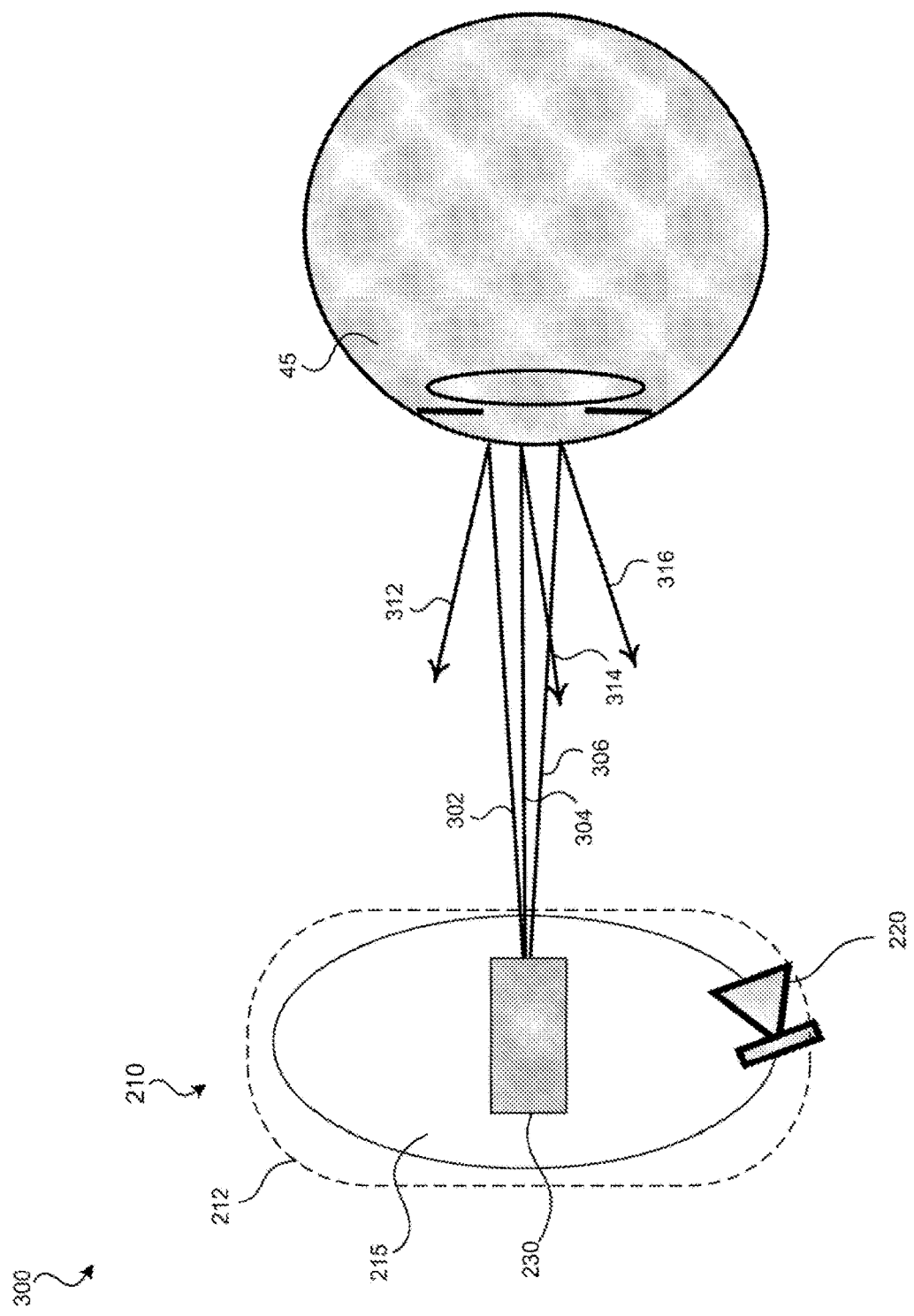
FIG. 3 illustrates an example eye-tracking system in accordance with some implementations.

FIG. 3 illustrates an example environment 300 of an eye-tracking system in accordance with some implementations. In particular, the eye-tracking system of example environment 300 illustrates tracking an eye characteristic of eye 45 via a light source 230 (e.g., a micro-IR LED, mini-IR LEDs, and the like) from an example lens 215 of device 210. The eye-tracking system of example environment 300 illustrates a single light system to observe glints that the eye 45 is reflecting into a camera (e.g., detector 220). For example, as illustrated in FIG. 3, the light source 230 (e.g., an IR LED or the like), directs light toward the eye 45 of the user. The light waves are then reflected off of the cornea of the eye 45 and detected by the detector 220. In one aspect, the light source 230 is used both for illuminating specular and diffusive parts of an object (e.g., eye 45) and thus may provide at least a threshold level of illumination. Providing at least such a threshold level of illumination may result in glints that would be detected in images captured by a detector 220. For example, light rays 302, 304, 306 from light source 230, would produce the specular glint light rays 312, 314, 316, respectively.

Figure 4:
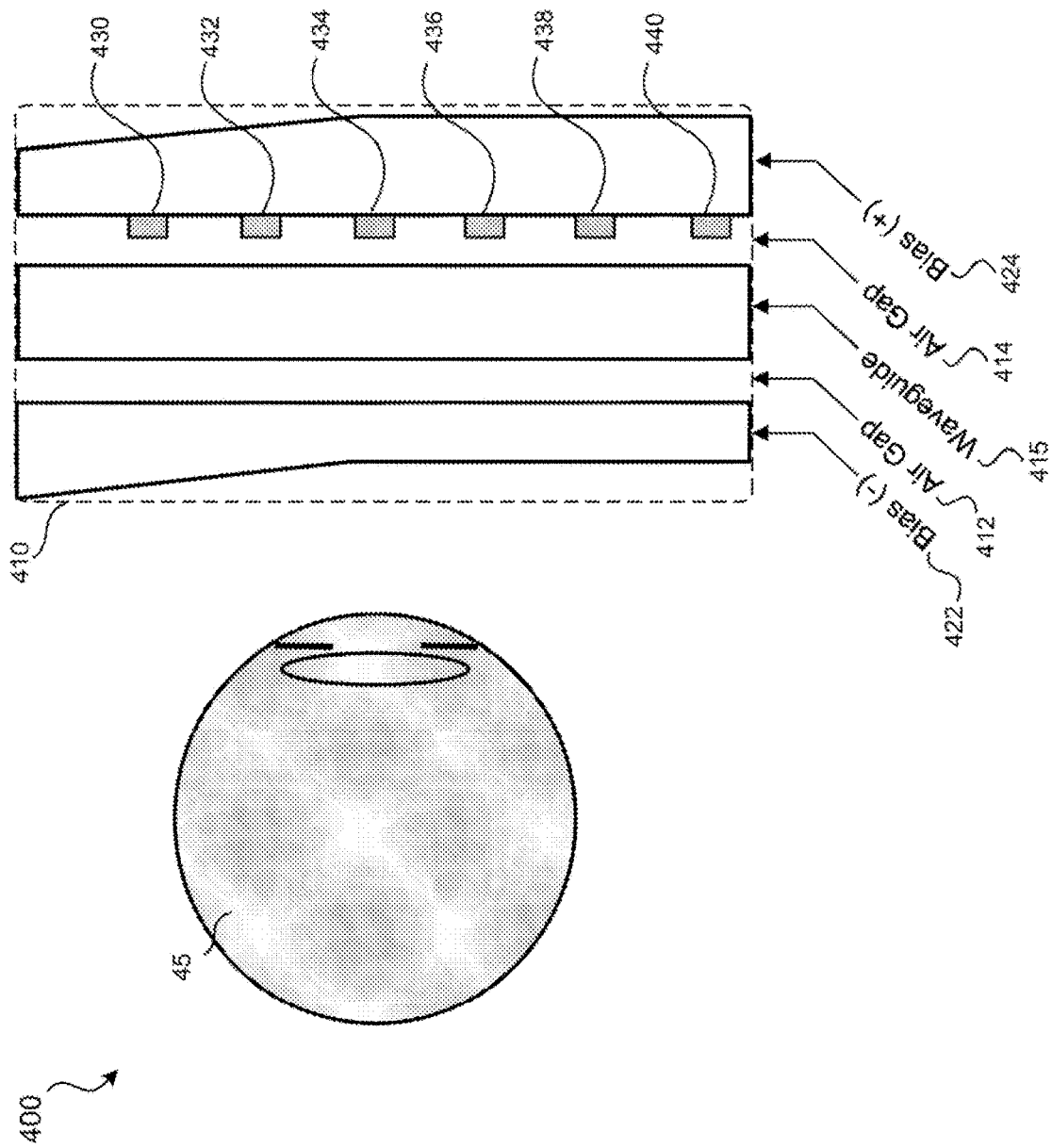
FIG. 4 illustrates an example of a plurality of light sources within a transparent substrate in accordance with some implementations.

FIG. 4 illustrates an example environment 400 of a plurality of light sources within a transparent substrate in accordance with some implementations. In particular, environment 400 illustrates an eye 45 looking through a lens 410 in a stacked configuration. Lens 410 illustrates an example lens, such as lens 215 used with within device 210 (e.g., an HMD). Lens 410, a transparent substrate, is stacked from a user's side (e.g., the side that faces the eye 45 of a user), with layers in order from the user's side to a world side: Bias (−) 422, air gap 412, waveguide 415, air gap 414, and Bias (+) 424. Each bias 422, 424 (also referred to herein as a "bias layer") may be used for prescription glasses, e.g., changing a level of prescription based on the size and shape of each bias. In some implementations, a prescription level is changed by only modifying one bias layer, e.g., Bias (+) 424.

The lens 410, also referred to herein as a "stack", may include different transparent or semi-transparent layers (e.g., not transparent but thin enough that they are not perceptible), may not include every layer as illustrated in FIG. 4 (e.g., only one air gap 412 or 414 may be utilized), and/or the layers may be in a different combination. For example, an additional layer may be a tint layer for the lens (e.g., different shades of tint for glasses), a cover glass layer, and a tint cover glass layer. The tint layer may include an organic electrochromic (EC) materials, also referred to herein as an organic EC tint layer.

The lens 410 includes a plurality of light sources 430, 432, 434, 436, 438, 440 (also referred to herein as light sources 430), that are embedded within the lens 410 between the waveguide 415 and the Bias (+) 424. In some implementations, each light source may be attached to the Bias (+) 424 layer. Alternatively, each light source 430-440 may be attached to or embedded within the waveguide 415. Alternatively, each light source 430-440 may be attached to any surface of the layers within lens 410. Each light source 430 may be connected to a controller (e.g., controller 250) via transparent conductors (e.g., transparent conductors 252, 254) which are not illustrated within example environment 400. Alternatively, in some embodiments, each light source 430 may be connected to a controller (e.g., controller 250) via semi-transparent conductors (e.g., silver nano traces) which are not illustrated within example environment 400. Semi-transparent may include material that is not transparent but thin enough that the material is not perceptible to a human eye. Each light source 430-440 may be placed within the air gap 414, as shown, embedded within the waveguide 415, embedded within the air gap 412, or in a combination of each, such that each light source 430-440 is located within the lens 410 (e.g., a transparent substrate) within a view of the eye 45. In sum, the plurality of light sources 430 may be placed at any interface in the stack/lens 410 (e.g., on side of a tint layer, behind the tint CG, on the waveguide itself, or on the CG as shown The light sources 430-440 may be dispersed within and throughout the lens 410 in a particular spatial arrangement. Examples of the different spatial arrangements that each light source 430-440 may be placed within the lens are illustrated with FIGS. 5A-5D.

FIGS. 5A-5D illustrate different spatial arrangements of a plurality of light sources within a transparent substrate for a HMD in accordance with some implementations. Each FIG. 5A-5D illustrates different configuration embodiments 500A-500D, respectively, that each include an example lens 510 (e.g., lens 215 for device 210), that includes a detector 520, a projector 540, a display 545, and a plurality of light sources (e.g., micro-IR LEDs, mini-IR LEDs, and the like) located in different spatial arrangements and embedded within each lens (e.g., as described herein and illustrated with reference to the stack configuration of FIG. 4). Not illustrated in each FIG. 5A-5D is a controller (e.g., controller 250) and transparent conductors (e.g., transparent conductors 252, 254) that are connected between the controller and provide and control power to each light source. In an exemplary implementation, only one detector 520 is necessary to acquire the light reflections from the plurality of light sources 530 from each spatial arrangement illustrated in FIGS. 5A-5D, and other different spatial arrangements discussed herein. That is, because the location of the light sources 530 are embedded within the lens 510, only one detector 520 is required. However, if the light sources 530 were positioned around the edge of the lens, such as on a frame of the lens 510, then at least a second detector may be required to obtained the reflected light because of the greater distance of reflection from the light sources on the frame to the eye. For example, a second camera would be needed if a difficult position (e.g., oblique) of the camera cannot see sufficient number of glints so the estimate of the eye characteristics, such as gaze, is inaccurate. For example, if a detector is observing an eye from 90°, the detector would not be able to detect a glint that are on the far-side of the cornea of the eye. Additionally, if the user is gazing in an extreme direction, the glints would also be difficult to detect from one detector at the other side of the extreme gaze direction.

Figure 5B:
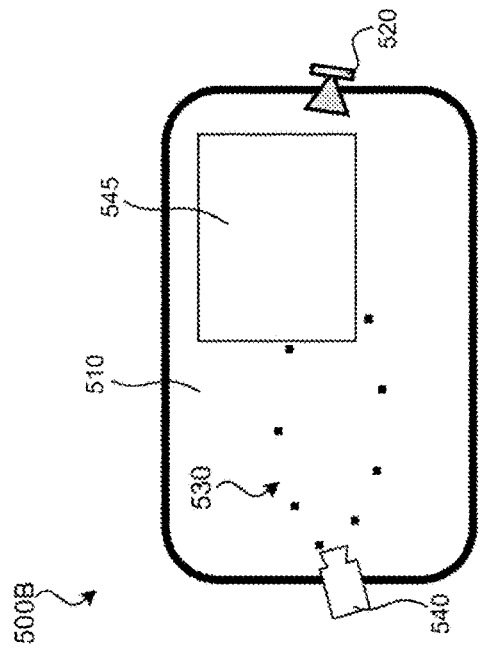
FIGS. 5A-5D illustrate different spatial arrangements of a plurality of light sources within a transparent substrate of an HMD in accordance with some implementations.
Figure 5D:
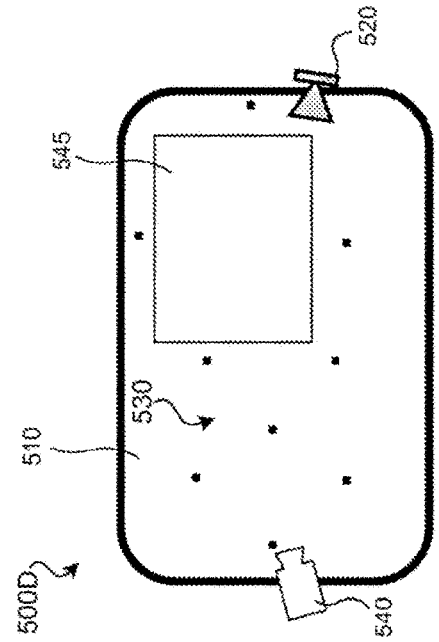
Figure 5A:
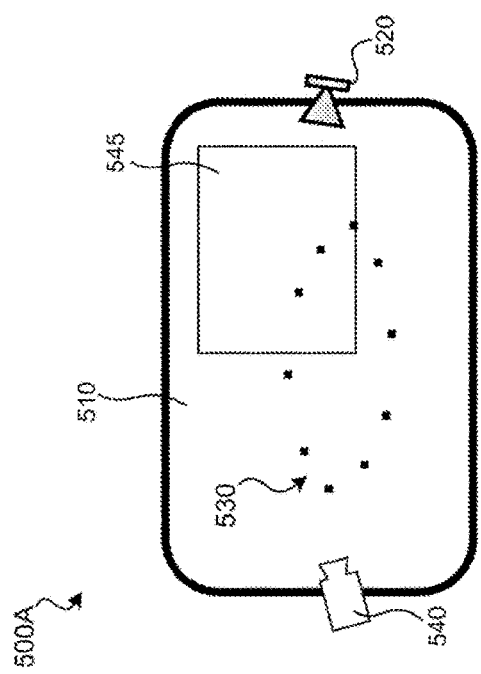

FIG. 5A illustrates a plurality of lights sources 530 with a spatial arrangement of an elliptical configuration with the display 545 that appears overlaid to a portion of the light sources 530. Because the light sources 530 (e.g., micro-IR LEDs, mini-IR LEDs, and the like) appear as transparent/translucent to the human eye due to proximity of the lens 510 when worn (e.g., undetectable LEDs), the light sources are not visible, but the display 545 is visible to the human eye. As discussed herein, the display 545, as illustrated, represents the location a user would view the XR content when wearing a device that includes the lens 510, however, the content is projected first to a different area within a waveguide, and the waveguide then bends and projects the light to that location at display 545. Thus, the illustration of the display 545 is for illustrative purposes.

Figure 5C:
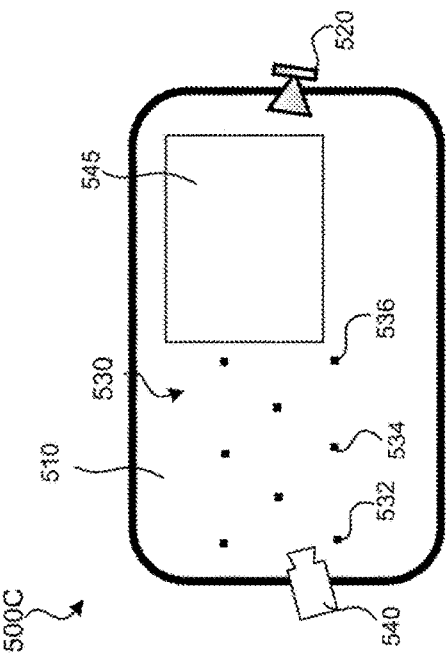

FIG. 5B illustrates a plurality of lights sources 530 with a spatial arrangement of an elliptical configuration with the display 545 that appears overlaid to a portion of the light sources 530. FIG. 5C illustrates a plurality of lights sources 530 with a spatial arrangement of grid configuration with the display 545 that appears next to the plurality of light sources 530. Additionally, the spatial arrangement of grid configuration of FIG. 5C illustrates each light source is evenly spaced, such that each light source is equidistant from each adjacent light source. For example, the distance between light source 532 and light source 534 is the same distance as light source 534 and light source 536. FIG. 5D illustrates a plurality of lights sources 530 with a spatial arrangement that is nonuniform, with none of the light sources overlapping the display 545.

Figure 6:
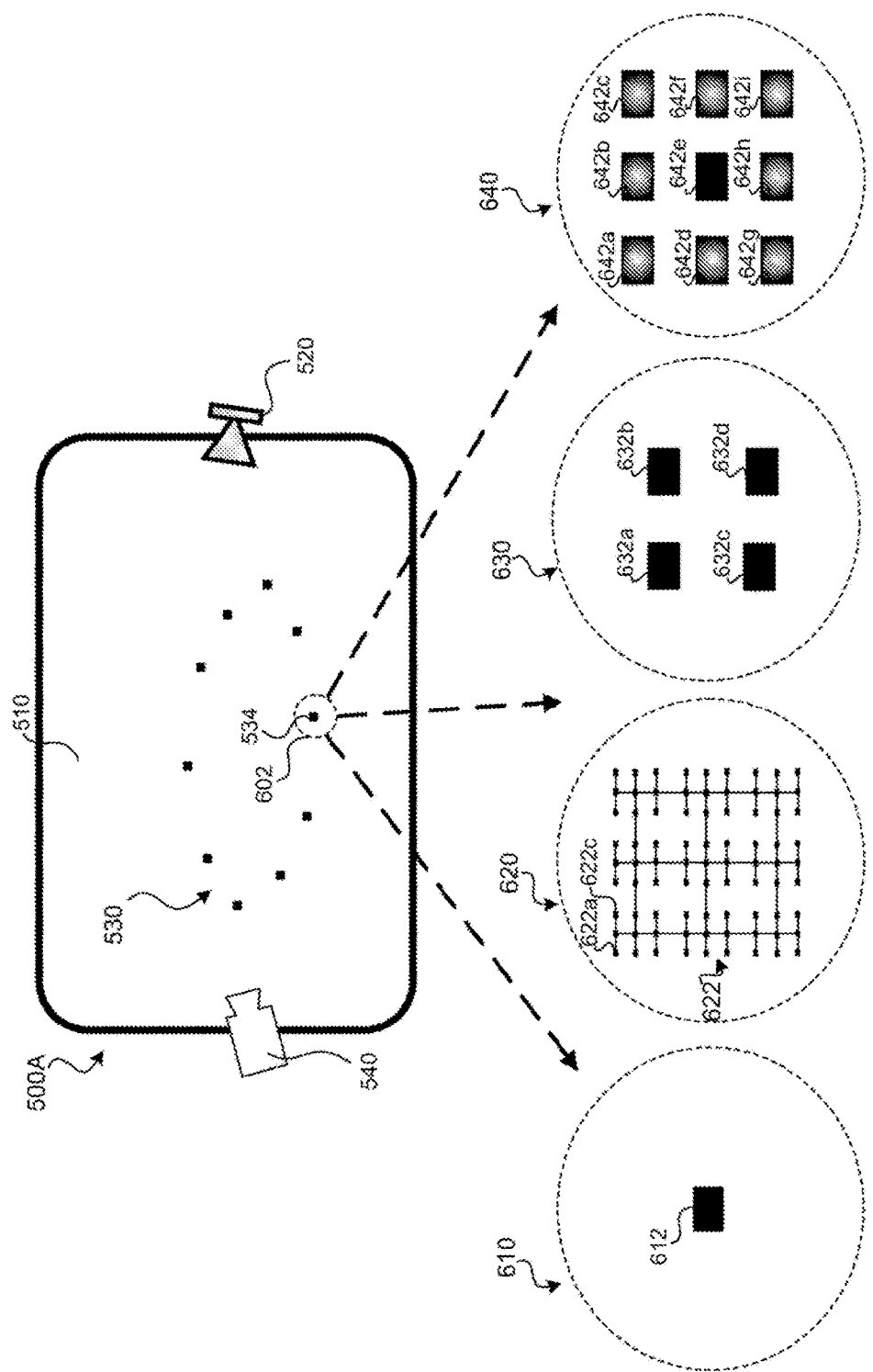
FIG. 6 illustrates different spatial arrangements of clusters of light sources for the plurality of light sources of FIGS. 5A-5D in accordance with some implementations.

FIG. 6 illustrates different spatial arrangements of clusters of light sources for the plurality of light sources of FIGS. 5A-5D in accordance with some implementations. FIG. 6 illustrates the example configuration embodiment 500A of FIG. 5A that includes a plurality of lights sources 530 with a spatial arrangement of an elliptical configuration. FIG. 6 further illustrates different cluster configurations that may be used for one or more of the plurality of light sources 530. For example, cluster configurations 610, 620, 630, 640 are exemplary cluster configurations that may represent the light source 534 as indicated by the region 602. The cluster configuration 610 illustrates an example single LED cluster that includes one light source 612 (e.g., a single 75 µm×50 µm LED). The cluster configuration 620 illustrates an example multi-LED cluster that includes a plurality of light sources 622 (e.g., 622a, 622c, etc.) in a grid/panel formation (e.g., 81 12 µm LEDs in a 250 µm×250 µm grid). The cluster configuration 630 illustrates an example multi-LED cluster that includes four light sources 632 (e.g., 632a-632d) in a 2×2 array formation (e.g., four 75 µm×50 µm LEDs in a 250 µm×250 µm array). The cluster configuration 640 illustrates an example multi-LED cluster that includes nine light sources 634 (e.g., 634a-634i) in a 3×3 array formation (e.g., nine 75 µm×50 µm LEDs in a 250 µm×250 µm array). In some implementations, the power may be adjusted for each light source with each of the different array formations (e.g., cluster configurations 610, 620, 630, 640, and the like). For example, power to a center LED (e.g., light source 642e in the middle of the 3×3 array formation) may be higher than the adjacent LEDs within the array in order to be the brightest light source in order to improve the location of the centroid of a glint.

Figure 7:
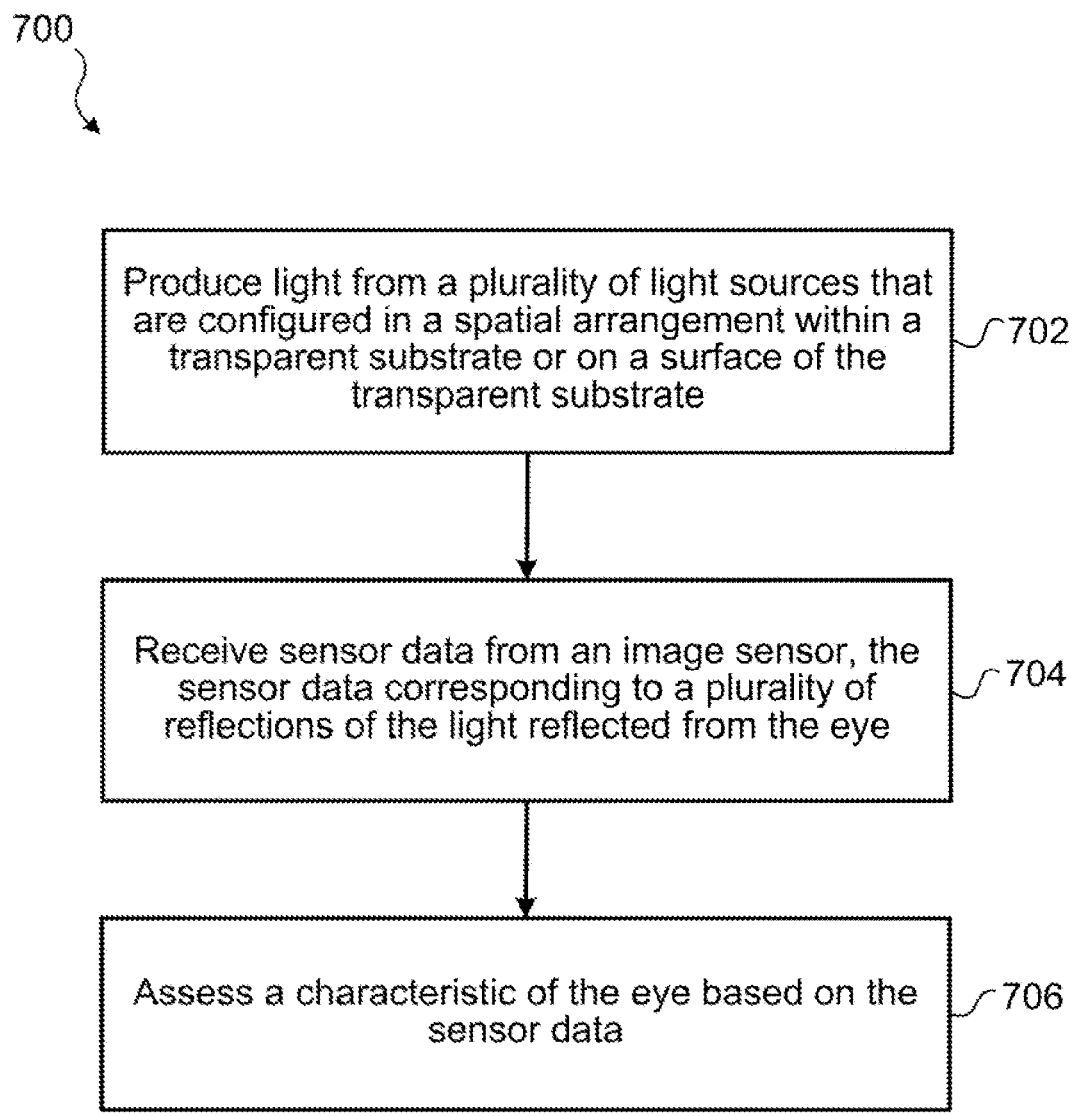
FIG. 7 is a flowchart representation of a method for assessing an eye characteristic of a user based on reflected light from a plurality of light sources on a transparent substrate in accordance with some implementations.

FIG. 7 is a flowchart illustrating an exemplary method 700. In some implementations, a device (e.g., device 110 of FIG. 1 or device 210 of FIG. 2) performs the techniques of method 700 to assess an eye characteristic of a user based on reflected light from a plurality of light sources on a transparent substrate. In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory). In some implementations, the method 700 is performed in combination of one or more devices as described herein. For example, sensor data from a plurality of light sensors may be acquired at an HMD (e.g., device 210), but the processing of the data (e.g., assess an eye characteristic) may be performed at a separate device (e.g., a mobile device, such as device 110).

At block 702, the method 700 produces light from a plurality of light sources that are configured in a spatial arrangement within a transparent substrate or on a surface of the transparent substrate, where the plurality of light sources are configured to direct light toward an eye. In some implementations, a waveguide is coupled to the transparent substrate and is configured to display a projected image. In some implementations, the transparent substrate is configured to display content. For example, a user is wearing an HMD, such as device 210, that includes a plurality of light sources (e.g., micro-IR LEDS, mini-IR LEDs, and the like, such as light source 230, 232, etc.).

The light sources produce a glint (e.g., a specular reflection) by producing light that reflects off a portion of an eye. In some implementations, the glint may be a specular glint. In some implementations, if a light source is used both for illuminating specular and diffusive parts of the object (e.g., eye 45 of the user 25), the specular "glints" must be in saturation in order to detect the diffusive area of the object. For example, as illustrated in FIG. 3, a light source 230 (e.g., a micro-IR LED, mini-IR LEDs, and the like) is flashed at an eye 45, and the detector 220 (e.g., an image sensor, such as an IR camera) detects the glint such as the reflected light rays (e.g., reflected light rays 314 and 316 from the light rays 304 and 306, respectively) from the eye 45.

In some implementations, the light is IR light. In some implementations, the light sources are LEDs. In some implementations, the light sources are very small IR LEDS, such as micro-IR LEDs or mini-IR LEDs. Alternatively, another type of light source may be used that sufficiently provides a glint (the point spread function (PSF) of the glint can be detected by the eye-tracking system at the detector) when the light from the light source is projected onto the eye, but are sufficiently small that they appear transparent (e.g., undetectable) to a human eye. In some implementations, the plurality of IR light sources are not perceptible to a human eye having average visual acuity when viewed from a distance of 1-5 cm. For example, an average vertex distance between an eye and a lens of a pair of eye glasses is approximately between 14 mm and 24 mm, thus the IR light sources within the transparent substrate would not be visible when the device described herein (e.g., an HMD) is worn by a user. In some implementations, the plurality of light sources are less than 200 micrometers in diameter. In some implementations, the plurality of light sources are less than 100 micrometers in diameter (or even smaller such as 75 µm, 50 µm, 25 µm, 5 µm, etc.).

In some implementations, the transparent substrate includes a bias layer (e.g., bias (−), bias (+)). For example, for prescription lenses, the bias layer may be modified based on prescription. In some implementations, the plurality of IR light sources are configured in a spatial arrangement on a surface of the bias layer. For example, as illustrated in FIG. 4, the plurality of IR light sources (430-440) are attached to the bias (+) 424 layer of the lens 410.

At block 704, the method 700 receives sensor data from an image sensor, the sensor data corresponding to a plurality of reflections of the light reflected from the eye. For example, the sensor (e.g., detector 220) may be an IR image sensor/detector that receives the reflections of light off of the eye (e.g., glints), such as reflected light rays 314 and 316 from the light rays 304 and 306, respectively, as illustrated in FIG. 3.

In some implementations, the method 700 determines a location of the glint based on the reflected light received at the sensor. For example, determining a location of the glint may include determining a centroid of the received light. In some implementations, multiple glints may be produced and located by the sensor (e.g., detector 220). For example, a centroid can be determined based on a non-saturated periphery (e.g., a halo).

At block 706, the method 700 determines an eye characteristic based on the sensor data. In some implementations, determining an eye characteristic may be based on a determined location of the glint. For example, the eye characteristic may include a gaze direction, eye orientation, identifying an iris of the eye, or the like, for an eye-tracking system. For example, if the electronic device is an HMD, the eye-tracking system for the HMD can track gaze direction, eye orientation, identification of the iris, etc., of a user.

In some implementations, determining an orientation of the eye is based on identifying a pattern of the glints/light reflections in an image. In one example, gaze direction may be determined using the sensor data to identify two points on the eye, e.g., a cornea center and an eyeball center. In another example, gaze direction may be determined using the sensor data (e.g., a pattern of glints) to directly predict the gaze direction. For example, a machine learning model may be trained to directly predict the gaze direction based on the sensor data.

In some implementations, for iris identification, the user may be uniquely identified from a registration process or prior iris evaluation. For example, the method 700 may include assessing the characteristic from the eye by performing an authentication process. The authentication process may include identifying an iris of an eye. For example, matching a pattern of glints/light reflections in an image with a unique pattern associated with the user. In some embodiments, the iris identification techniques (e.g., matching patterns), may be used for anti-spoofing. For example, there could be multiple enrolled patterns that may be changed and can be used to authenticate a user's iris against a pre-enrolled biometric template, and confirm that the user is the right person, a real person, and is authenticating in real-time. Iris identification may be used as a primary authentication mode or as part of a multi-factor or step up authentication. The matching patterns may be stored in a database located on the HMD (e.g., device 210), another device communicatively coupled to the HMD (e.g., a mobile device in electronic communication with the HMD), an external device or server (e.g., connected through a network), or a combination of these or other devices.

In some implementations, determining an eye characteristic includes determining locations of multiple portions of the eye based on determining locations of multiple glints. For example, as illustrated in FIG. 3, a light source 230 (e.g., a micro-IR LED, a mini-IR LED, or the like) may illuminate the eye 45 in multiple areas creating more than one glint that may each be detected at the detector 220.

In some implementations, assessing the characteristic from the eye is based on sensor data from a single sensor. For example, based on the location of the plurality of light sources being directly on the transparent substrate within a view of the user (albeit transparent), only one sensor or camera (e.g., detector 220) is required to capture the light reflections. If the light sources were located around the frame 212 of device 210, then two or more sensors would be needed to pick up the glints.

In some implementations, the sensor (e.g., detector 220) includes an image sensor and receiving the reflected light (e.g., light rays 314 and 316) includes receiving the reflected light from image data from the sensor. For example, detector 220 is an image sensor that acquires image data of the light rays 314 and 316.

In some implementations, the device executing the techniques of method 700 (e.g., device 210) includes a frame, an image sensor, a transparent substrate coupled to the frame, and the transparent substrate including a plurality of IR light sources (e.g., micro-IR LEDs, mini-IR LEDs, and the like). In some implementations, the transparent substrate is configured to display content. The plurality of IR light sources may be configured in a spatial arrangement on a surface of the transparent substrate, and a processor is coupled to the plurality of IR light sources. In some implementations, the processor is configured to receive sensor data from the image sensor, the sensor data corresponding to a plurality of reflections of light produced by the plurality of IR light sources and reflected from an eye.

In some implementations, the transparent substrate includes a waveguide. In some implementations, the plurality of light sources are embedded within the transparent substrate. For example, as illustrated in FIG. 4, the light sources 430, 432, and the like, are embedded within the transparent substrate (e.g., lens 410) and positioned in the air gap 414 between the waveguide 415 and the bias (+) 424. In some implementations, the light sources 430, 432, and the like, and the transparent conductors connecting the light sources to the controller 250 (e.g., power source and processor) are embedded within or on top of the waveguide 415.

In some implementations, the processor (e.g., controller 250) is coupled to the plurality of IR light sources via transparent conductors (e.g., transparent conductors 252, 254 of FIG. 2). For example, the controller 250 includes a processor and a power source that controls the light being emitted from the light sources 234, 236, via transparent conductors 252, 254, respectively. In some implementations, the plurality of light sources are individually addressable. For example, a processor within the controller 250 can control each light source 230, 232, 234, 236, etc. individually. For example, a pattern of IR flashes can be created based on the spatial arrangement of the light sources, and the controller can control each light source to mimic the intended pattern. For example, for the spatial arrangement of FIG. 5A, the controller 250 can control each light source 230, 232, 234, 236 to pulsate each individual light source at different frequencies, or at the same frequency but at a different offsets (e.g., to create a time sequenced loop of IR flashes around the oval shaped arrangement).

In some implementations, each light source is equidistant from an adjacent light source, as illustrated in FIG. 5C. For example, the spatial arrangement of the plurality of IR light sources is an evenly displaced grid 3×3, 4×4, etc. In some implementations, each light source is spaced from each adjacent light source based on a minimum distant constraint. For example, a micro-LED constraint of ~7 mm.

In some implementations, the plurality of light sources are divided into subgroups, and each subgroup includes two or more light sources of the plurality of light sources. In some implementations, the subgroups of the plurality of light sources are dispersed throughout the transparent substrate. For example, the light sources may be grouped in numbers of three lights sources per group, and each group may be spread out in any spatial arrangement discussed herein (e.g., an equidistant grid, an ellipse, a box, etc.).

In some implementations, the spatial arrangement includes a geometric shape. In some implementations, the geometric shape includes shapes such as a parabola, an ellipse, a hyperbola, a cycloid, or the like. In some implementations, the geometric shape is based on a transcendental curve or an algebraic curve. For example, as illustrated in FIGS. 5A-5D, several different spatial arrangements may be provided for the plurality of light sources. Each spatial arrangement may provide improved sensitivity and improved performance for eye tracking and assessing eye characteristics as described herein.

Figure 8:
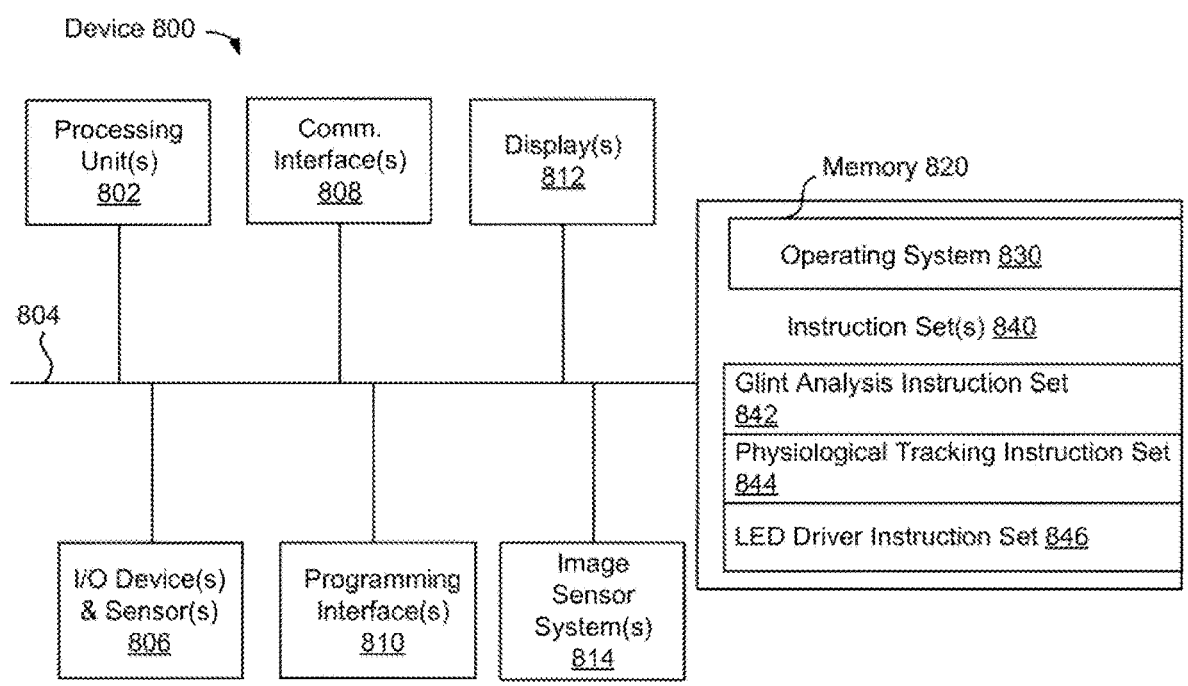
FIG. 8 is a block diagram illustrating device components of an exemplary device according to some implementations.

FIG. 8 is a block diagram of an example device 800. Device 800 illustrates an exemplary device configuration for devices 110 and 210. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 800 includes a single display. In another example, the device 800 includes a display for each eye of the user (e.g., device 210).

In some implementations, the one or more image sensor systems 814 are configured to obtain image data that corresponds to at least a portion of the physical environment 5. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a glint analysis instruction set 842, a physiological tracking instruction set 844, and an LED driver instruction set 846. The instruction set(s) 840 may be embodied a single software executable or multiple software executables.

In some implementations, the glint analysis instruction set 842 is executable by the processing unit(s) 802 to determine a location of a glint based on reflected light received at a sensor. The glint analysis instruction set 842 (e.g., enrollment instruction set 420 of FIG. 4) may be configured to receive reflected light at a sensor (e.g., an IR image sensor/detector) after passing through a multi-zone lens having a first zone (e.g., a halo-producing zone) and a second zone (e.g., normal curvature), where the first zone and second zone having different energy-spreading characteristics; (e.g., the first zone has a different curvature, a tilt, etc.). Additionally, the glint analysis instruction set 842 may be configured to determine a location of a glint based on the reflected light received at the sensor. To these ends, in various implementations, the instruction includes instructions and/or logic therefor, and heuristics and metadata therefor.

In some implementations, the physiological tracking (e.g., eye gaze characteristics) instruction set 644 is executable by the processing unit(s) 802 to track a user's eye gaze characteristics or other physiological attributes based on the determined location of the glint (e.g., from the glint analysis instruction set 842) using one or more of the techniques discussed herein or as otherwise may be appropriate. To these ends, in various implementations, the instruction includes instructions and/or logic therefor, and heuristics and metadata therefor.

In some implementations, the LED driver instruction set 846 is executable by the processing unit(s) 802 to activate and control the light sources (e.g., IR LEDs), such as light sources 530 in FIGS. 5A-5D, using one or more of the techniques discussed herein or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. An electronic device comprising:
   a frame associated with eyeglasses;
   an image sensor;
   a transparent substrate coupled to the frame, the transparent substrate comprising a plurality of infrared (IR) light sources, wherein the plurality of IR light sources are configured to direct light toward an eye and are configured in a spatial arrangement within the transparent substrate or on a surface of the transparent substrate;
   a waveguide coupled to the transparent substrate, wherein the waveguide is configured to display a projected image; and
   a processor coupled to the plurality of IR light sources, the processor configured to:
      receive sensor data from the image sensor, the sensor data corresponding to a plurality of reflections of light produced by the plurality of IR light sources and reflected from the eye.

2. The electronic device of claim 1, wherein the processor is coupled to the plurality of IR light sources via transparent conductors.

3. The electronic device of claim 1, wherein the transparent substrate is configured to display content.

4. The electronic device of claim 1, wherein the transparent substrate comprises a bias layer, and the plurality of IR light sources are configured in a spatial arrangement on a surface of the bias layer.

5. The electronic device of claim 1, wherein the transparent substrate comprises the waveguide.

6. The electronic device of claim 1, wherein each light source is equidistant from an adjacent light source.

7. The electronic device of claim 1, wherein each light source is spaced from each adjacent light source based on a minimum distant constraint.

8. The electronic device of claim 1, wherein the plurality of IR light sources are embedded within the transparent substrate.

9. The electronic device of claim 1, wherein the plurality of IR light sources are connected to a power source via transparent conductors.

10. The electronic device of claim 1, wherein the plurality of IR light sources are less than 200 micrometers in diameter.

11. The electronic device of claim 1, wherein the plurality of IR light sources are less than 100 micrometers in diameter.

12. The electronic device of claim 1, wherein the plurality of IR light sources are individually addressable.

13. The electronic device of claim 1, wherein the plurality of IR light sources are micro light emitting diodes (LEDs).

14. The electronic device of claim 1, wherein the plurality of IR light sources are micro-infrared (IR) LEDs.

15. The electronic device of claim 1, wherein the plurality of IR light sources are miniature light emitting diodes (mini-LEDs).

16. The electronic device of claim 1, wherein the plurality of IR light sources are divided into subgroups, each subgroup comprising two or more light sources of the plurality of light sources.

17. The electronic device of claim 16, wherein the subgroups of the plurality of IR light sources are dispersed throughout the transparent substrate.

18. The electronic device of claim 1, wherein the spatial arrangement comprises a geometric shape.

19. The electronic device of claim 18, wherein the geometric shape comprises:
a parabola,
an ellipse,
a hyperbola, or
a cycloid.

20. The electronic device of claim 18, wherein the geometric shape is based on a transcendental curve or an algebraic curve.

21. The electronic device of claim 18, wherein the plurality of IR light sources are not perceptible to a human eye having average visual acuity when viewed from a distance of 1-5 cm.

22. The electronic device of claim 1, wherein the electronic device is a head-mounted device (HMD).

23. A method comprising:
at an electronic device having a processor:
producing light from a plurality of light sources that are configured in a spatial arrangement within a transparent substrate or on a surface of the transparent substrate, wherein the plurality of light sources are configured to direct light toward an eye, wherein the transparent substrate is coupled to a frame associated with eyeglasses, and wherein a waveguide is coupled to the transparent substrate and is configured to display a projected image;
receiving sensor data from an image sensor, the sensor data corresponding to a plurality of reflections of the light reflected from the eye; and
assessing a characteristic of the eye based on the sensor data.

24. The method of claim 23, wherein assessing the characteristic from the eye comprises determining an orientation of the eye based on identifying a pattern of the plurality of reflections of the light reflected from the eye.

25. An electronic device comprising:
a transparent substrate coupled to a frame associated with eyeglasses;
a waveguide coupled to the transparent substrate and configured to display a projected image;
a plurality of light sources configured in a spatial arrangement within the transparent substrate or on a surface of the transparent substrate;
an image sensor;
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
producing light from the plurality of light sources on the transparent substrate, wherein the light from the plurality of light sources is configured to direct light toward an eye;
receiving sensor data from the image sensor, the sensor data corresponding to a plurality of reflections of the light reflected from the eye; and
assessing an eye characteristic based on the sensor data.

26. The electronic device of claim 1, wherein the plurality of IR light sources are positioned near the eye when the eyeglasses are worn on a head of a user.

* * * * *